United States Patent [19]
Mischo et al.

[11] 3,746,234
[45] July 17, 1973

[54] MICROFILM READER

[75] Inventors: Klaus Mischo; Karl Bammesberger; Erwin Fischer, all of Munich; August Seizinger, Unterhaching, all of Germany

[73] Assignee: Agfa-Gevaert Aktiengesellschaft, Leverkusen, Germany

[22] Filed: Apr. 25, 1972

[21] Appl. No.: 247,272

[30] Foreign Application Priority Data

Apr. 27, 1971 Germany............P 21 20 685.9

[52] U.S. Cl............ 226/196, 242/76, 226/118
[51] Int. Cl............................................. B65h 23/04
[58] Field of Search................ 226/196, 197, 198, 226/199; 242/76

[56] References Cited
UNITED STATES PATENTS
1,966,684  7/1934  Pollock.................... 226/196 X
2,996,951  8/1961  Debrie..................... 226/196 UX
FOREIGN PATENTS OR APPLICATIONS
884,192  8/1943  France.................... 226/196 UX Primary Examiner—Allen N. Knowles
Attorney—Michael S. Striker

[57] ABSTRACT

A microfilm reader wherein the housing defines a first chamber for a cassette containing a supply of microfilm and a second chamber for storage of loose loops of microfilm. A motor-driven feeding mechanism serves to draw microfilm from the cassette and to introduce successive increments of microfilm into the inlet of an elongated guide wherein the microfilm advances toward the second chamber. The first chamber is parallel with the front wall and the second chamber is parallel with the rear wall or with a side wall of the housing. The guide defines a narrow channel which has at least two portions located in mutually inclined planes and one or more additional portions wherein the microfilm is twisted on its way into the second chamber. The guide consists of one or more flexible elastic carriers for a series of crosspieces each of which defines a part of the channel and is provided with integral or rotary guide elements for the marginal portions of microfilm.

16 Claims, 8 Drawing Figures

MICROFILM READER

BACKGROUND OF THE INVENTION

The present invention relates to improvements in microfilm readers or analogous apparatus wherein a web or strip of photographic film or similar strip-shaped or web-shaped material is transported for the purposes of retrieving information which is recorded thereon. Such apparatus further include copying machines for photographic film, motion picture projectors and others.

It is already known to provide a microfilm reader with a motor-operated feeding unit which transports microfilm lengthwise, either for the purpose of rapidly locating a selected film frame or a selected group of film frames, or for the purpose of rewinding microfilm onto a supply reel or spool. Such readers are normally further provided with photoelectric scanning devices which can track the microfilm for the presence of coding symbols, such as black lines which are exposed onto the frame lines between successive film frames, as well as with a film collecting and intercepting chamber wherein the microfilm forms a series of loose loops prior to being rewound onto the core of the supply reel. The supply reel may but need not be stored in a cassette or an analogous container. A drawback of the just outlined conventional microfilm readers is that their housing occupies too much space. This is attributable to a considerable extent to the provision of the film collecting and intercepting chamber wherein the microfilm forms loose loops and which must be large enough to accommodate a full length of microfilm. The situation is further aggrevated when the feeding unit is designed to transport microfilm at a very high speed so that a very short interval of time is available for the scanning of successive microfilm frames. The microfilm collecting and intercepting chamber is normally located in the plane of the supply of convoluted microfilm from which the feeding unit draws microfilm to transport it across the optical axis of the projection system and on toward the collecting chamber. Since a supply of convoluted microfilm is normally located in a plane which is parallel to the front wall of the housing of a microfilm reader, namely, parallel to the plane of the projection screen in the front wall of the housing, the width and often also the height of the housing of the microfilm reader must be increased beyond a practical size for the sole purpose of accommodating the collecting chamber in the plane of the supply of convoluted microfilm.

It was already proposed to place the microfilm collecting chamber at a level below the platform along which the microfilm advances during the projection of images of successive frames onto the screen. This is undesirable for a number of reasons, for example, it is necessary to unduly increase the height of the housing so that the apparatus cannot be used as a table model, and also because the space below the platform is normally utilized for storage of spare microfilms or for other auxiliary equipment.

SUMMARY OF THE INVENTION

An object of the invention is to provide a microfilm reader or analogous apparatus for retrieval of information which is stored on photographic film or the like wherein the supply of convoluted web-shaped material need not be coplanar with the chamber wherein the web is collected after it passes the station where its frames are scanned for the purpose of projecting their images onto a screen or for the purpose of making copies of such frames.

Another object of the invention is to provide an apparatus of the just outlined character with a relatively large web-collecting chamber which can occupy space that is normally available in the housings of such apparatus so that the dimensions of the apparatus need not be unduly increased for the sole purpose of accommodating a relatively large web-collecting chamber.

A further object of the invention is to provide a microfilm reader with novel and improved means for guiding the microfilm between the platform on which successive film frames are guided during the projection of their images onto a screen and the microfilm collecting chamber.

Still another object of the invention is to provide guide means which can automatically assume a shape best suited for accommodation of such guide means, together with a relatively large microfilm collecting chamber, in a relatively small housing of a microfilm reader, copying machine or motion picture projector.

An additional object of the invention is to provide the guide means with novel and improved elements for properly guiding the marginal portions of microfilm during transport into the collecting chamber, and with novel and improved means for insuring that the leader of microfilm automatically finds its way into the collecting chamber.

A feature of the invention resides in the provision of an apparatus, particularly a microfilm reader, wherein a web of flexible material is transported between a first station and a second station. The apparatus comprises feeding means for withdrawing the web from a source of supply at the first station and for advancing the web lengthwise, and elongated web guiding and confining means disposed between the feeding means and the second station and defining for the web an elongated narrow channel wherein the web advances toward the second station. The channel has a plurality of longitudinally spaced portions which are located in mutually inclined planes. The channel may further include at least one portion which is at least slightly twisted, as considered in the longitudinal direction of the guide means. The guide means is preferably flexible and at least partially elastic so that it can assume a shape which is best suited to insure proper transport of successive increments of the web to the second station without any scratching, tearing and/or other damage to the web.

The feeding means and the guide means are accommodated in a housing which has a plurality of walls including several side walls and a rear wall. In accordance with another feature of the invention, the second station accommodates a relatively large web-collecting chamber which is preferably parallel to a side wall or to the rear wall of the housing and is inwardly adjacent thereto. This insures that the width of the housing need not be unduly increased for the sole purpose of accommodating the web-collecting chamber in the plane of the supply of convoluted web at the first station. Such supply can be stored on a spool or reel which may but need not be received in a cassette or an analogous container.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
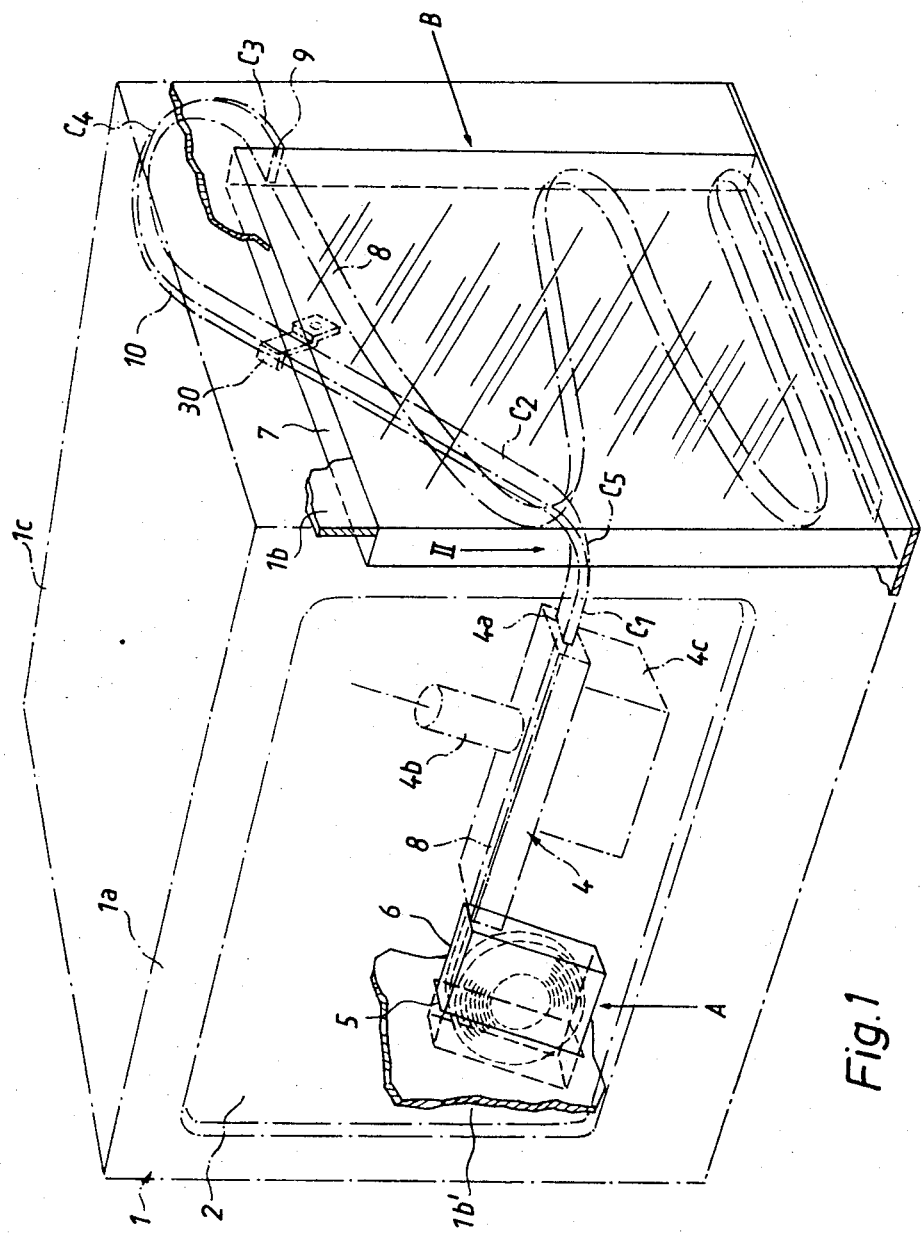
FIG. 1 is a diagrammatic perspective partly sectional view of a microfilm reader which embodies one form of the invention and wherein the collecting chamber is parallel to a side wall of the housing.

Referring first to FIG. 1, there is shown the housing 1 of a microfilm reading apparatus which comprises a front wall 1a, two side walls 1b, 1b', and a rear wall 1c. The major part of the front wall 1a is taken up by a projection screen 2. The reference character 4 denotes the image projecting or retrieving unit which includes a film platform 4a, a customary projection lens 4b, a motor-operated film feeding mechanism 4c and certain other equipment which forms no part of the present invention. The housing 1 further accommodates certain mirrors and other elements which project the image of a selected frame of microfilm 8 onto the screen 2. Furthermore, the image retrieving unit 4 includes a suitable detector system which scans the microfilm 8 for coding marks so as to allow for rapid selection of a desired microfilm frame.

The image retrieving unit 4 further comprises a suitable source of light which is disposed below the path for the microfilm 8 on the platform 4a. The left-hand side wall 1b' of the housing 1 is provided with a slot-shaped inlet 5 which permits insertion or withdrawal of a container or cassette 6 for convoluted microfilm 8. When properly inserted, the container 6 occupies a first station A which is located ahead of the image retrieving unit 4 as considered in the direction of microfilm transport toward a second station B which is adjacent to the inner side of the side wall 1b and is occupied by a relatively large microfilm intercepting and collecting chamber 7. The upper portion of the chamber 7 is provided with a lateral inlet 9 through which successive increments of microfilm 8 enter to form in the chamber 7 a series of loose loops which are clearly shown in FIG. 1 and which descend by gravity into the lower portion of the chamber 7. The internal space of the chamber 7 is large enough to accept the entire length of microfilm 8 which is stored in a container 6, and the width of such internal space only slightly exceeds the width of microfilm 8 so that the latter cannot be twisted or otherwise unduly deformed during introduction into the chamber as well as during the formation of loose loops. In the illustrated embodiment, the height of the collecting chamber 7 almost equals the height of the side wall 1b.

Figure 3:
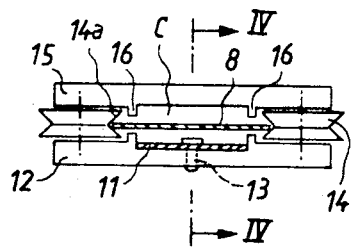
FIG. 3 is a transverse sectional view as seen in the direction of arrows from the line III—III of FIG. 2.

In accordance with a feature of the invention, the housing 1 further accommodates novel elongated film guide means 10 (hereinafter called guiding and confining device) which serves to guide the microfilm 8 during travel from the right-hand end of the film platform 4a to the inlet 9 of the chamber 7. As shown in FIG. 3, the film guiding and confining device 10 defines an elongated narrow channel C wherein the microfilm 8 travels on its way from the platform 4a into the upper portion of the chamber 7. The channel C includes several successive portions some of which are located in mutually inclined planes and some of which are configurated in such a way that they cause a slight twisting of the microfilm 8 during travel therethrough. As shown in FIG. 1, the channel C includes three substantially flat and mutually inclined portions C1, C2, C3, and two curved portions C4 and C5 which may, but need not cause some twisting of microfilm 8 during passage toward the inlet 9 of the chamber 7. The inlet 9 is immediately adjacent to the outlet of the guiding and confining device 10.

Figure 4:
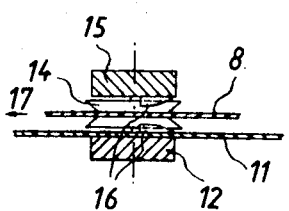
FIG. 4 is a fragmentary longitudinal sectional view as seen in the direction of arrows from the line IV—IV of FIG. 3.
Figure 2:
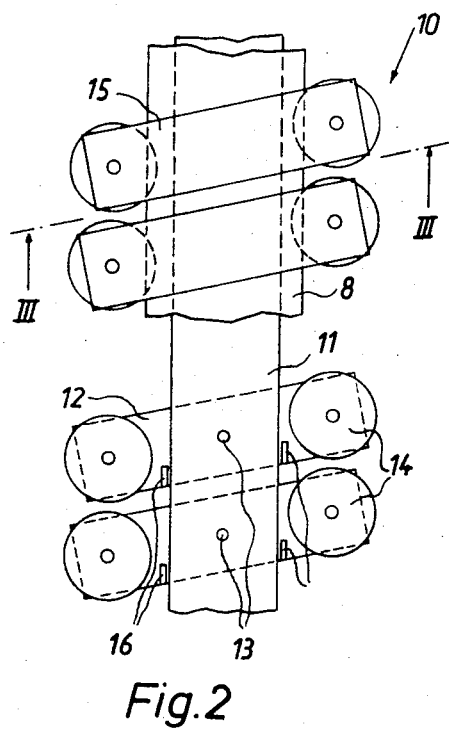
FIG. 2 is a fragmentary plan view of a detail of the guide means in the microfilm reader of FIG. 1, substantially as seen in the direction indicated by the arrow II.

Referring now to FIGS. 2, 3 and 4, there are shown the details of the guiding and confining device 10. This device comprises a band-like elastic flexible carrier 11 which may be made of steel and carries a plurality of crosspieces each of which includes first section 12 and a second section 15. The sections 12 are secured to the carrier 11 intermediate their ends, for example, by means of rivets 13 or analogous fasteners so that they can be turned about the axes defined by such fasteners. Each crosspiece 12, 15 further comprises a pair of guide elements here shown as guide rolls 14 which are arranged in pairs and flank the adjacent parts of the channel C. The shafts of the guide rolls 14 are mounted in the lower sections 12 of the crosspieces and are disposed at the opposite sides of the channel C. The sections 15 are separably secured to the respective sections 12 so that they hold the corresponding pairs of guide rolls 14 against accessive axial movement, see particularly FIG. 3. The lower portion of FIG. 2 shows two of the crosspieces with their sections 15 removed so as to reveal pairs of projections 16 which resemble runners or cams and flank the channel C. Similar projections 16 are also provided on the sections 15 (see FIGS. 3 and 4). The purpose of the projections 16 is to facilitate proper threading of the leader of microfilm 8 through the channel C while such leader travels toward the inlet 9 of the chamber 7. The peripheries of the guide rolls 14 are provided with substantially V-shaped grooves 14a which receive the marginal portions of the microfilm 8 when the latter is properly introduced into the corresponding portion of the channel C. FIGS. 3 and 4 show that, when the microfilm 8 is properly introduced into the device 10, its major surfaces are not contacted by the threading projections 16 of the sections 12 and 15. Thus, the microfilm 8 is then guided only by the innermost surfaces in the grooves 14a of the guide rolls 14. It is preferred to mount the crosspieces 12, 15 in such a way that they make an acute angle with the longitudinal direction of microfilm 8 in the channel C. It was found that such mounting of the cross-pieces (which is best shown in FIG. 2) facilitates proper threading of the leader of microfilm through the channel C and into the upper portion of the chamber 7. It can be said that the guide rolls 14 at one side of the channel C are staggered or offset with respect to the guide rolls 14 at the other side of the channel.

If desired, the microfilm intercepting and collecting chamber 7 can be placed adjacent to the inner side of the rear wall 1c or even adjacent to the inner side of the top wall of the housing 1. Such freedom in selecting the position of the chamber 7 is possible because the guiding and confining device 10 is sufficiently flexible due to deformability of its carrier 11 so that it can direct the microfilm 8 in any desired direction.

It is also within the purview of the invention to make the guiding and confining device 10 of a single piece of synthetic plastic material. However, it was found that a guiding and confining device of the type shown in FIGS. 2 to 4 exhibits a number of important advantages. Thus, it can be assembled of simple and inexpensive parts, its manufacture does not require the utilization of complex molds such as would be necessary for the production of a one-piece plastic guiding device, and it can be produced in any desired length to be thereupon subdivided into sections each having a length which is necessary in a particular housing. It was also found that relatively long guiding devices which are made of synthetic plastic material cannot be manufactured with the desired degree of precision so as to insure proper guidance of microfilm between the platform 4a and the inlet 9 of the chamber 7. This holds especially true if the one-piece synthetic plastic guiding device has to include a plurality of sections or portions which are located in mutually inclined planes and if some portions must be twisted in a manner as shown in FIG. 1, as at C4 and C5.

Another important advantage of the guiding device 10 shown in FIGS. 2 to 4 is that it insures a minimum of contact between the microfilm 8 and the components of the device 10. Thus, and as shown in FIG. 3, only the edge faces of the marginal portions of microfilm 8 contact the guide rolls 14 in the bottom regions of the respective V-shaped grooves 14a. Were the guiding device 10 made of a single piece of synthetic plastic material, the internal surfaces of such guiding device would have to be finished with a very high degree of precision in order to insure that the microfilm could properly slide therein and also to avoid scratching and/or other damage to microfilm. The flexible carrier 11 of the guiding device 10 shown in FIGS. 2 to 4 can be readily deformed in such a way that the portions C4 and C5 of the channel C have a configuration which is least likely to cause undue twisting or other undesirable deformation of microfilm on its way into the chamber 7 or back from the second station B to the first station A. When the ends of the carrier 11 are properly secured to the chamber 7 in the region of the inlet 9 and to the right-hand portion of the platform 4a, the intermediate portion of the carrier automatically tends to assume a configuration or a shape which is least likely to cause excessive twisting or other deformation of microfilm 8 while the microfilm travels in the channel C. This holds true regardless of whether the carrier 11 is deformed in such a way that its portions are located in planes which make an angle of 90° with each other or an obtuse angle which is greater or less than 90°. The carrier 11 will invariably tend to assume a position in which the compressive and tensional stresses upon the microfilm 8 in the channel C are minimal and in which the radius of curvature of each arcuate portion of the channel C assumes a maximum possible value. This is highly desirable in microfilm reading apparatus in order to avoid damage to the film even if the feeding unit 4c is caused to transport the film at a very high speed, regardless of whether the film is being advanced toward the inlet 9 or back into the container 6.

In order to assist the carrier 11 of the guiding device 10 to assume an optimum configuration, it is desirable to provide the interior of the housing 1 with at least one but if necessary two or more supporting brackets 30 which engage and support an intermediate portion of the carrier 11 so as to insure that the action of gravity cannot unduly affect the position of the carrier in the space between the platform 4a and the inlet 9 of the chamber 7. It is clear that the supporting means can assume any other suitable shape. The provision of one or more supporting brackets 30 is further desirable in order to reduce the undesirable effect of characteristic vibrations of the carrier 11 when the apparatus is in use.

The guiding device 10 can be further modified by mounting the guide rolls directly on the carrier 11. However, it was found that the construction shown in FIGS. 2 to 4 is more desirable because the guide rolls can be assembled with the section 12 and/or 15 of the crosspiece in a first step and the pairs of sections 12, 15 are thereupon mounted on the carrier 11 at a desired distance from each other.

Figure 5:
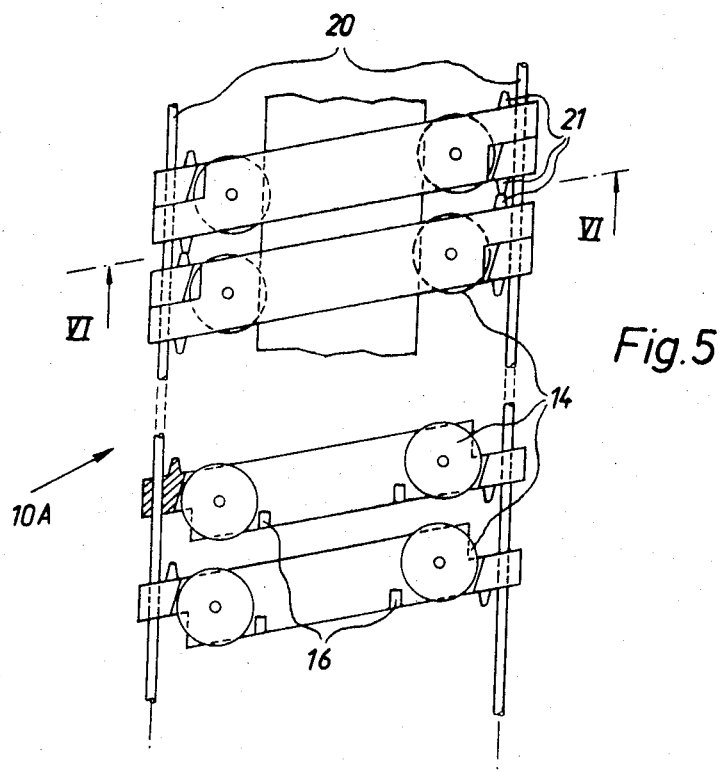
FIG. 5 is a fragmentary plan view of a portion of a modified guide means for microfilm.
Figure 6:
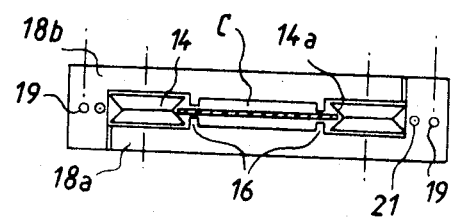
FIG. 6 is a sectional view as seen in the direction of arrows from the line VI—VI of FIG. 5.

FIGS. 5 and 6 illustrate a modified elongated film guiding and confining device 10A which comprises two flexible elastic carriers 20 which resemble rods or wires. Each crosspiece comprises two sections 18a and 18b which are provided with lateral holes or bores 19 for the passage of carriers 20. The guide rolls 14 are rotatably mounted between pairs of properly assembled sections 18a and 18b. Such sections can be held together by removable or permanently installed fasteners, not shown. The sections 18a and 18b are provided with projections 16 which serve the same purpose as the similarly numbered projections in the guiding device 10 of FIGS. 2 to 4, namely, they facilitate proper threading of the leader of microfilm 8 through the channel C which is defined by the guiding device 10A. The sections 18a, 18b of each crosspiece are further provided with distancing elements or protuberances 21 which hold the adjoining crosspieces at a desirable minimum distance from each other. This is best shown in the upper portion of FIG. 5. Since the diameters of the guide rolls 14 preferably at least slightly exceed the width of the assembled crosspieces, the distancing elements 21 prevent interference between the adjoining guide rolls and eventual damage to the marginal portions of microfilm 8. The sections 18a, 18b of the crosspieces shown in FIGS. 5 and 6 can be held on the carriers 20 by friction so that they can be shifted lengthwise to any desired positions. The sections 18a, 18b (as well as the sections 12, 15 of FIGS. 2 to 4) can be made of a suitable metallic or synthetic plastic material. The provision of guide rolls 14 is particularly desirable when the feeding unit 4c is called upon to transport the microfilm 8 at a very high speed. When the guiding device 10 or 10A utilizes such guide rolls, the friction between the microfilm and the components of the guiding device is practically nil.

The main purpose of the projections 16 is to properly guide the leader of microfilm 8. It is clear that such projections are necessary mainly as a precautionary measure because, under normal circumstances, the leader can automatically find its way into the grooves 14a of the guide rolls 14 and is advanced toward and through the inlet 9 of the collecting chamber 7. However, since the crosspieces need not and often cannot be placed immediately adjacent to each other, the leader can escape between two pairs of successive guide rolls 14 if such rolls are located at a substantial distance from each other.

Figure 7:
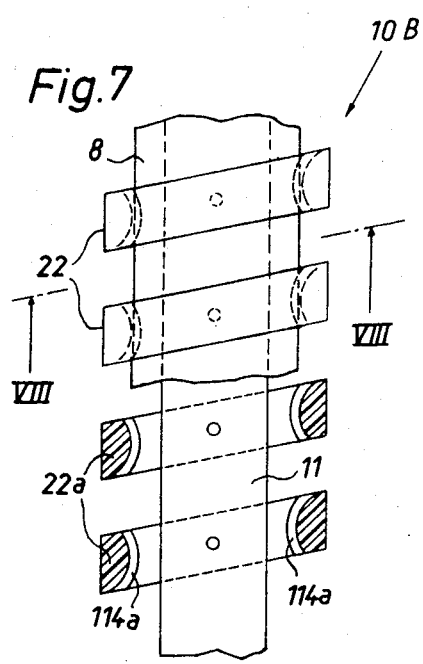
FIG. 7 is a fragmentary plan view of a third guide means, with a portion of the guide means shown in section as seen in the direction of arrows from the line VII—VII of FIG. 8.
Figure 8:
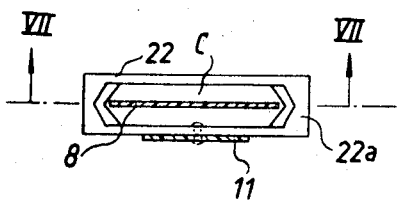
FIG. 8 is a transverse sectional view as seen in the direction of arrows from the line VIII—VIII of FIG. 7.

Referring finally to FIGS. 7 and 8, there is shown a portion of a third elongated film guiding and confining device 10B which comprises one-piece crosspieces 22. These crosspieces define parts of an elongated channel C wherein the microfilm 8 advances from the platform 4a toward the inlet 9 of the collecting chamber 7. As shown in FIG. 7, the lateral portions 22a of the crosspieces 22 constitute guide elements which replace the guide rolls 14 of FIGS. 2 to 6 and have convex guide surfaces provided with V-shaped grooves 114a wherein the marginal portions of microfilm 8 travel toward the chamber 7. FIGS. 7 and 8 do not show any projections such as the projection 16 of FIG. 3, but it is clear that such projections can be provided on the upper and/or lower sections of the one-piece crosspieces 22. The crosspieces 22 are separably or permanently secured to a flexible elastic carrier 11 which is preferably similar to or identical with the carrier 11 of FIG. 2. Such carrier may consist of steel. The guiding device 10B of FIGS. 7 and 8 is less expensive than the guiding devices 10 and 10A because it need not be provided with discrete guide rolls which are rotatably mounted in the respective crosspieces. However, the friction between the crosspieces 22 and the marginal portions of microfilm 8 is greater than that between the microfilm and the guide rolls 14. Therefore, the device 10B of FIGS. 7 and 8 will be utilized mainly in microfilm readers wherein the film need not be transported at a very high speed.

It is clear that the improved guiding devices 10, 10A or 10B can find use in many other types of apparatus wherein a web of flexible material is transported between first and second stations for the purpose of retrieving information which is stored thereon. Such other types of apparatus include motion picture projectors and printing apparatus wherein successive frames of photographic film are copied onto a strip of paper or the like. Furthermore, and as mentioned above, the guide rolls 14 or analogous guide elements can be provided on the carrier or carriers so that the discrete crosspieces can be dispensed with. Still further, the collecting chamber 7 can be replaced with a cassette or with an analogous container, or the second station B can accommodate a permanently mounted or removable reel or spool having on its core suitable clamping means which can engage and temporarily hold the leader of microfilm or other web-shaped material when such material reaches the core.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and the range of equivalence of the claims.

What is claimed as new and desired to be protected by Letters Patent is:

1. In an apparatus of the character indicated, particularly in a microfilm reader, wherein a web of flexible material is transported between a first station and a second station, a combination comprising feeding means for withdrawing the web from a source of supply at said first station and for advancing the web lengthwise; and elongated web guiding and confining means disposed between said feeding means and said second station and defining for the web an elongated narrow channel wherein the web advances toward said second station, said channel having a plurality of longitudinally spaced portions located in mutually inclined planes.

2. A combination as defined in claim 1, wherein said channel further includes at least one portion which is at least slightly twisted, as considered in the longitudinal direction of said guide means.

3. A combination as defined in claim 1, further comprising a housing for said feeding means and said guide means, said housing having a plurality of walls and said second station being inwardly adjacent to one of said walls.

4. A combination as defined in claim 3, further comprising a web intercepting and collecting chamber provided at said second station and extending in parallelism with said one wall, said chamber having an inlet and said guide means having an outlet adjacent to said inlet so that successive increments of the web which leave said channel are compelled to enter said chamber.

5. A combination as defined in claim 4, wherein said chamber has a width which slightly exceeds the width of the web and includes an upper portion and a lower portion, said inlet being provided in said upper portion so that the web which enters said chamber descends by gravity and is looped in said chamber.

6. A combination as defined in claim 1, wherein said guide means comprises at least one longitudinally extending flexible carrier and a plurality of cross-pieces mounted on said carrier and defining longitudinally spaced parts of said channel.

7. A combination as defined in claim 6, further comprising a platform for guiding the web in the region of said feeding means and a web-collecting chamber provided at said second station and having a web-admitting inlet, said carrier having end portions secured to said platform and to the inlet of said chamber.

8. A combination as defined in claim 6, wherein said carrier has end portions respectively located in the regions of said feeding means and said second station, and further comprising means for supporting said carrier at at least one point intermediate said end portions thereof.

9. A combination as defined in claim 6, wherein said carrier is a strip consisting of elastomeric material which directly supports said crosspieces.

10. A combination as defined in claim 6, wherein said guide means further comprises web-engaging guide elements provided in said crosspieces.

11. A combination as defined in claim 1, wherein said guide means comprises a plurality of elongated flexible carriers consisting of elastomeric material and a plurality of crosspieces mounted on said carriers and each defining a part of said channel.

12. A combination as defined in claim 11, wherein said carriers are rods.

13. A combination as defined in claim 1, wherein said guide means comprises a plurality of cross-pieces each defining a part of said channel and each having grooved guide elements for the marginal portions of the web in said channel.

14. A combination as defined in claim 1, wherein said guide means comprises a plurality of cross-pieces each defining a part of said channel, and pairs of rollers mounted in said crosspieces at the opposite sides of said channel and having circumferential grooves for the marginal portions of the web in said channel.

15. A combination as defined in claim 1, wherein said guide means comprises pairs of guide elements disposed at the opposite sides of said channel and having grooves receiving the marginal portions of the web in said channel, and means for threading the marginal portions of a web into said grooves while the leader of such web advances from said first station toward said second station.

16. A combination as defined in claim 15, wherein said guide means further comprises crosspieces for said pairs of guide elements and said threading means, said threading means including projections provided on said crosspieces and positioned thereon to be out of contact with a web in said channel when the marginal portions of such web extend into said grooves.

* * * * *